(12) United States Patent
Maynard

(10) Patent No.: US 6,466,846 B2
(45) Date of Patent: Oct. 15, 2002

(54) METHOD, APPARATUS, SYSTEM, AND COMPUTER SOFTWARE PROGRAM PRODUCT FOR DETERMINING POSITION INTEGRITY IN A SYSTEM HAVING A GLOBAL NAVIGATION SATELLITE SYSTEM (GNSS) COMPONENT

(75) Inventor: James H. Maynard, Salem, OR (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

(21) Appl. No.: 09/790,251

(22) Filed: Feb. 21, 2001

(65) Prior Publication Data

US 2002/0116098 A1 Aug. 22, 2002

Related U.S. Application Data

(60) Provisional application No. 60/217,229, filed on Jul. 10, 2000.

(51) Int. Cl.$^7$ ................................................. G06F 7/00
(52) U.S. Cl. ..................... 701/13; 701/207; 701/213; 701/214; 342/357.06; 342/357.12
(58) Field of Search ..................... 701/13, 207, 213, 701/214, 215; 342/357.06, 357.12, 357.15

(56) References Cited

U.S. PATENT DOCUMENTS

| | | | |
|---|---|---|---|
| 5,381,140 A | 1/1995 | Kuroda et al. | |
| 5,446,465 A | 8/1995 | Diefes et al. | |
| 5,504,492 A | 4/1996 | Class et al. | |
| 5,570,095 A | 10/1996 | Drouilhet, Jr. et al. | |
| 5,760,737 A | 6/1998 | Brenner | |
| 5,808,581 A * | 9/1998 | Braisted et al. | 701/213 |
| 5,831,576 A | 11/1998 | Sheynblat | |
| 5,910,788 A | 6/1999 | Class | |
| 5,910,789 A * | 6/1999 | Vigen | 342/357.01 |
| 5,923,286 A * | 7/1999 | Divakaruni | 342/357.01 |
| 5,926,132 A | 7/1999 | Brenner | |
| 5,931,889 A * | 8/1999 | Misra | 701/213 |
| 5,969,668 A | 10/1999 | Young, Jr. | |
| 5,969,672 A | 10/1999 | Brenner | |
| 6,204,806 B1 * | 3/2001 | Hoech | 342/357.02 |
| 6,205,377 B1 * | 3/2001 | Lupash et al. | 701/13 |

FOREIGN PATENT DOCUMENTS

WO  WO 00/39603  7/2000

OTHER PUBLICATIONS

Brenner, M., "Implementation of a RAIM Monitor in a GPS Receiver and an Integrated GPS/IRS", International Technical Meeting of the Satellite Division of the Institute of Navigation, Washington, D.C., Sep. 19, 1990, pp. 397–406.

Nilsson, J., "Time Augmented GPS/DGPS in Sweden", Vehicle Navigation and Information Systems Conference, Ottawa, Ont., Canada, Oct. 12–15, 1993, pp. 718–731.

* cited by examiner

Primary Examiner—Gertrude Arthur
(74) Attorney, Agent, or Firm—Alston & Bird LLP

(57) ABSTRACT

A method is provided for determining position integrity in a system having a Global Navigation Satellite System (GNSS) component, such as, for example, a Global Positioning System (GPS) device. For successive alarm limits, with each alarm limit corresponding to a position integrity level, it is determined whether valid position integrity information is available. At the alarm limit at which valid position integrity information is first available, a corresponding position integrity level is determined. If no valid position integrity information is available for any of the alarm limits, a default position integrity level is then designated. An associated apparatus, system, and computer software program product are also provided.

39 Claims, 3 Drawing Sheets

FIG. 3

| HPL (AND VPL) RANGES 850 | ALTITUDE TYPE | CORRESPONDING HFOM (AND VFOM) (FROM TABLE 2-1a in ADS-B MASPS, RTCA DOCUMENT DO-242) 900 | TYPE CODE 650 | NUC$_P$ VALUE 700 |
|---|---|---|---|---|
| NO HORIZONTAL POSITION INFO | PRESSURE ALTITUDE | N/A | 0 | 0 |
| HORIZONTAL POSITION, BUT NO INTEGRITY | | HFOM ≥ 10 NM (18.52 km) | 18 | 0 |
| HPL < 7.5 m | | HFOM < 3 m | 9 | TBD |
| 7.5 m ≤ HPL < 25 m | | 3 m ≤ HFOM < 10 m | 10 | TBD |
| 25 m ≤ HPL < 0.1 NM | | 10 m ≤ HFOM < 0.05 NM (92.6 m) | 11 | 7 |
| 0.1 NM ≤ HPL < 0.2 NM | PRESSURE ALTITUDE | 0.05 NM ≤ HFOM < 0.1 NM (182.5 m) | 12 | 6 |
| 0.2 NM ≤ HPL < 0.5 NM | | 0.1 NM ≤ HFOM < 0.25 NM (463 m) | 13 | 5 |
| 0.5 NM ≤ HPL < 1 NM | | 0.25 NM ≤ HFOM < 0.5 NM (926 m) | 14 | 4 |
| 1 NM ≤ HPL < 2 NM | | 0.5 NM ≤ HFOM < 1.0 NM (1852 m) | 15 | 3 |
| 2 NM ≤ HPL < 10 NM | | 1.0 NM ≤ HFOM < 5 NM (9.26 km) | 16 | 2 |
| 10 NM ≤ HPL < 20 NM | | 5 NM ≤ HFOM < 10 NM (18.52 km) | 17 | 1 |
| HPL > 20 NM | | HFOM ≥ 10 NM (18.52 km) | 18 | 0 |
| HPL < 7.5 m AND VPL < 10 m | GNSS HEIGHT (HAE) | HFOM < 3 m AND VFOM < 4 m | 20 | 9 |
| HFOM < 25 m AND VPL < 37.5 m | | HFOM < 10 m AND VFOM < 15 m | 21 | 8 |
| HPL ≥ 25 m OR VPL ≥ 37.5 m | | HFOM ≥ 10 m OR VFOM ≥ 15 m | 22 | TBD |

METHOD, APPARATUS, SYSTEM, AND COMPUTER SOFTWARE PROGRAM PRODUCT FOR DETERMINING POSITION INTEGRITY IN A SYSTEM HAVING A GLOBAL NAVIGATION SATELLITE SYSTEM (GNSS) COMPONENT

CROSS-REFERENCE TO RELATED APPLICATIONS

This application claims the benefit of U.S. Provisional Patent Application No. 60/217,229, filed Jul. 10, 2000.

FIELD OF THE INVENTION

The present invention relates to navigational systems and, more particularly, to a method, apparatus, system, and computer software program product for determining position integrity in a navigational system having a Global Navigation Satellite System (GNSS) component.

BACKGROUND OF THE INVENTION

Global Navigation Satellite Systems (GNSS) such as, for example, GPS devices, are well known in the art and are commonly used to determine the geodetic latitude and longitude coordinates of mobile vehicles employing such devices. For simplicity, a GPS device will be discussed herein as an example of a GNSS, wherein the terms "GNSS" and "GPS" may be used interchangeably. However, it will be understood by one skilled in the art that the present invention is not restricted to a GPS device and may be applicable to other GNSS-type devices according to the spirit and scope of the present invention.

With a GPS device, information signals transmitted from a plurality of satellites to a GPS receiver are analyzed using known trilateration techniques in order to determine the geodetic coordinates of the receiver, wherein the geodetic coordinates are typically provided in latitude and longitude. The geodetic coordinates (latitude and longitude), however, may vary in accuracy due to, for example, atmospheric conditions, selective satellite availability, and the relevant positions of the satellites with respect to the line-of sight view of the satellites. Often associated with this variance in GPS accuracy is an integrity determination, which produces a warning if it is determined that the GPS accuracy is insufficient to be relied upon for navigational purposes. Accordingly, where a GPS integrity system is provided, a maximum horizontal position error, otherwise referred to as a "horizontal protection level" (HPL) may be determined and compared to an allowable radial error, otherwise referred to as a "horizontal alarm limit" (HAL). If the HPL is found to exceed the HAL, then a warning is issued that the geodetic coordinates should not be relied upon for accuracy.

One method of determining the integrity of a GPS system is the Receiver Autonomous Integrity Monitoring (RAIM) concept which is typically implemented in software in the GPS receiver and which employs an instantaneous self-consistency check during the determination of the geodetic coordinates. In order for RAIM to function as intended, a minimum plurality of satellite signals are required. Where such a minimum plurality of satellite and/or satellite signals are not available, the RAIM internal consistency check may not be available ("RAIM unavailable"), where, in turn, no horizontal position integrity information is available. In addition, the RAIM may also generate error values based upon the consistency check, which are then compared to predetermined error limits. Accordingly, should an error value exceed the corresponding error limit, a RAIM alarm may be generated to indicate the failure of the consistency check ("RAIM alarm"), where, in other words, horizontal position data may be available, but without integrity. In such instances, where RAIM is not available or a RAIM alarm is generated, the integrity of the geodetic coordinates may be questionable. Thus, there exists a need for a GNSS device capable of determining the integrity of measured geodetic coordinates in instances where RAIM is not available or a RAIM alarm has been generated.

In some instances, the GPS device may be interfaced with other navigational equipment, wherein the GPS device may also be relied upon to provide location coordinates as well as position integrity information. For example, the GPS device may be interfaced with a Mode S transponder, via a processing unit, with the transponder configured to receive position integrity information from the GPS device as is known in the art. The position integrity information is converted into a corresponding code in a data stream, which is then transmitted by the transponder. The data thus transmitted by the transponder indicates the position of the vehicle carrying the GPS device as well as the level of integrity and/or accuracy of that position information.

An interfaced GPS device may be classified as, for example, a "sole means of navigation" GPS receiver ("DO-229A GPS receiver") as identified in a document entitled "Minimum Operational Performance Standards for Global Positioning System/Wide Area Augmentation System Airborne Equipment", document number RTCA/DO-229A, or a "supplemental navigation" device ("DO-208 GPS receiver") as identified in a document entitled "Minimum Operational Performance Standards for Airborne Supplemental Navigation Equipment Using Global Positioning System (GPS)", document number RTCA/DO-208, wherein both documents are incorporated herein by reference in their entirety. Where a "sole means of navigation" GPS receiver is available to be interfaced with the transponder, a RAIM algorithm in the GPS receiver provides an HPL to the processing unit when RAIM is available and no RAIM alarm is present. However, if RAIM is not available or a RAIM alarm is present, an HPL is not provided to the processing unit and the transponder is thus not able to transmit any position integrity and/or accuracy information. Further, where a "supplemental navigation" device is provided, such a device is typically capable of determining geodetic coordinates, but may or may not be configured to execute a RAIM algorithm. Even if a RAIM algorithm is executed by the device, the device is typically not configured to return an HPL to the processing unit since "supplemental navigation" devices are not required to be capable of determining an HPL. Thus, there also exists a need for a method of determining position integrity information when a vehicle is equipped with a "supplemental navigation" device lacking the capability of determining an HPL. In addition, there exists a further need for a "sole means of navigation" GPS receiver capable of determining the integrity of measured geodetic coordinates in instances where RAIM is not available or a RAIM alarm has been generated Thus, there exists a need for a GNSS device capable of determining the integrity of measured geodetic coordinates in instances where RAIM is not available or a RAIM alarm has been generated. There also exists a need for a method of determining position integrity information when a vehicle is equipped with a "supplemental navigation" device lacking the capability of determining an HPL.

SUMMARY OF THE INVENTION

The above and other needs are met by the present invention which, in one embodiment, provides a method for determining position integrity in a system having a Global Navigation Satellite System (GNSS) component. For an alarm limit in a plurality of successive alarm limits, with each alarm limit corresponding to a position integrity level, it is selectively determined whether valid position integrity information is available. At the alarm limit at which valid position integrity information is first available, a corresponding position integrity level is determined. If no valid position integrity information is available for any of the alarm limits, a default position integrity level is then designated.

Another advantageous aspect of the present invention comprises an apparatus for determining position integrity information, and transmitting at least one of position accuracy information and position integrity information, in a system having a GNSS component such as, for example, a Global Positioning System (GPS) device. The apparatus comprises a transponder configured to transmit a type code indicative of position accuracy and/or integrity, a navigational device capable of executing a Receiver Autonomous Integrity Monitoring (RAIM) algorithm to determine whether valid position integrity information is available, and a processing unit in communication with the transponder and the navigational device. The processing unit is configured to selectively provide successive alarm limits to the RAIM algorithm executed by the navigational device, wherein the processing unit is also configured to determine a valid position integrity level corresponding to the alarm limit at which valid position integrity information is first available. The processing unit is further configured to designate a default position integrity level if no valid position integrity information is available for any of the alarm limits. The processing unit is thereafter configured to direct to the transponder at least one of the valid position integrity level, the default position integrity level, and a position accuracy level corresponding to at least one of the valid position integrity level and the default position integrity level, from which the transponder thereafter determines the corresponding type code for transmission.

Still another advantageous aspect of the present invention comprises a system capable of determining position integrity information, and transmitting position accuracy information and/or position integrity information, in an apparatus having a GNSS component such as, for example, a Global Positioning System (GPS) device. The system comprises a computer device having a first processing portion for directing the execution of a RAIM algorithm to determine whether valid position integrity information is available. A second processing portion selectively provides successive alarm limits to the RAIM algorithm so as to determine a valid position integrity level corresponding to the alarm limit at which valid position integrity information is first available. A third processing portion designates a default position integrity level if no valid position integrity information is available for any of the alarm limits. A fourth processing portion then directs to a transponder at least one of the valid position integrity level, the default position integrity level, and a position accuracy level corresponding to at least one of the valid position integrity level and the default position integrity level, from which the transponder thereafter determines the corresponding type code for transmission.

Yet another advantageous aspect of the present invention comprises a computer software program product for determining position integrity information, and transmitting position accuracy information and/or position integrity information, in a system having a GNSS component such as, for example, a Global Positioning System (GPS) device. The computer software program product comprises a first executable portion configured to direct the execution of a RAIM algorithm to determine whether valid position integrity information is available. A second executable portion selectively provides successive alarm limits to the RAIM algorithm so as to determine a valid position integrity level corresponding to the alarm limit at which valid position integrity information is first available. A third executable portion is configured to designate a default position integrity level if no valid position integrity information is available for any of the alarm limits. A fourth executable portion then directs to a transponder at least one of the valid position integrity level, the default position integrity level, and a position accuracy level corresponding to at least one of the valid position integrity level and the default position integrity level, from which the transponder thereafter determines the corresponding type code for transmission.

Thus, embodiments of the present invention provide a method, apparatus, system, and computer software program product for determining position integrity in a system having a GNSS component. Embodiments of the present invention also provide a GNSS device capable of determining the integrity of measured geodetic coordinates in instances where RAIM is not available or a RAIM alarm has been generated. Embodiments of the present invention are further capable of determining position integrity when a vehicle is equipped with a "supplemental navigation" device lacking the capability of determining an HPL. Thus, embodiments of the present invention provide distinct advantages over prior art navigational systems having a GNSS component.

BRIEF DESCRIPTION OF THE DRAWINGS

Some of the advantages of the present invention having been stated, others will appear as the description proceeds, when considered in conjunction with the accompanying drawings, which are not necessarily drawn to scale, in which:

FIG. 3 is an exemplary table of position integrity levels, representative of a set of alarm limits, and corresponding position accuracy levels, transmission type codes, and Navigation Uncertainty Categories for Position ($NUC_P$) values according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
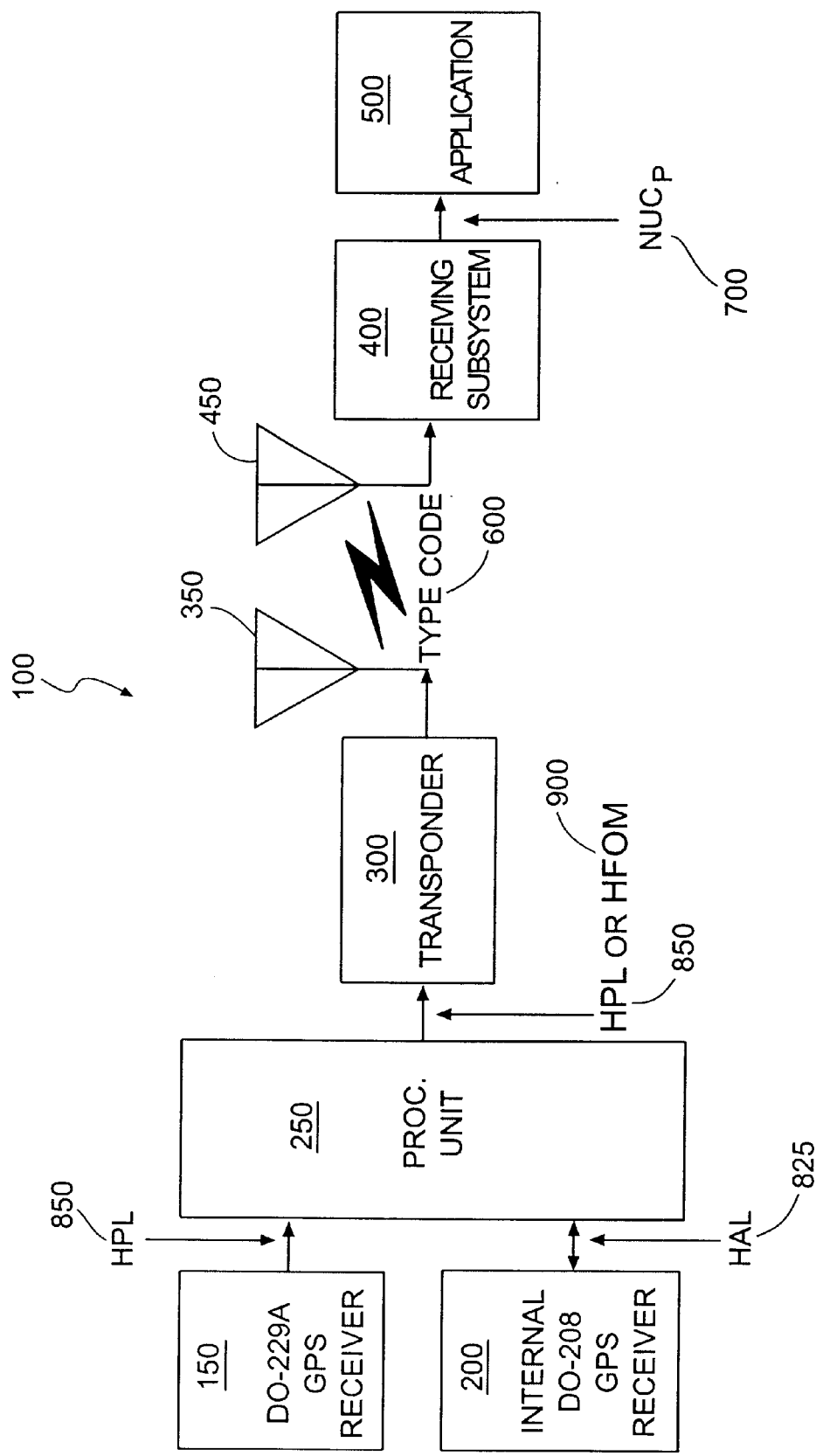
FIG. 1 is a schematic representation of a navigational system having a GNSS component according to one embodiment of the present invention.

FIG. 1 schematically illustrates one embodiment of a navigational system having a GNSS component, such as, for example, a GPS device, wherein the navigational system is indicated generally by the numeral 100 and includes the features of the present invention. The navigational system 100 may comprise, for example, a "sole means of navigation" (DO-229A) GPS receiver 150, a "supplemental navigation" (DO-208) GPS receiver 200, a processing unit 250, and a transponder 300 with a corresponding antenna 350. The navigational system 100 is generally configured to form and transmit a position message 550 (and as shown in FIG. 2) to a receiving subsystem 400 with a corresponding antenna 450 in communication with a terminal application 500.

Figure 2:
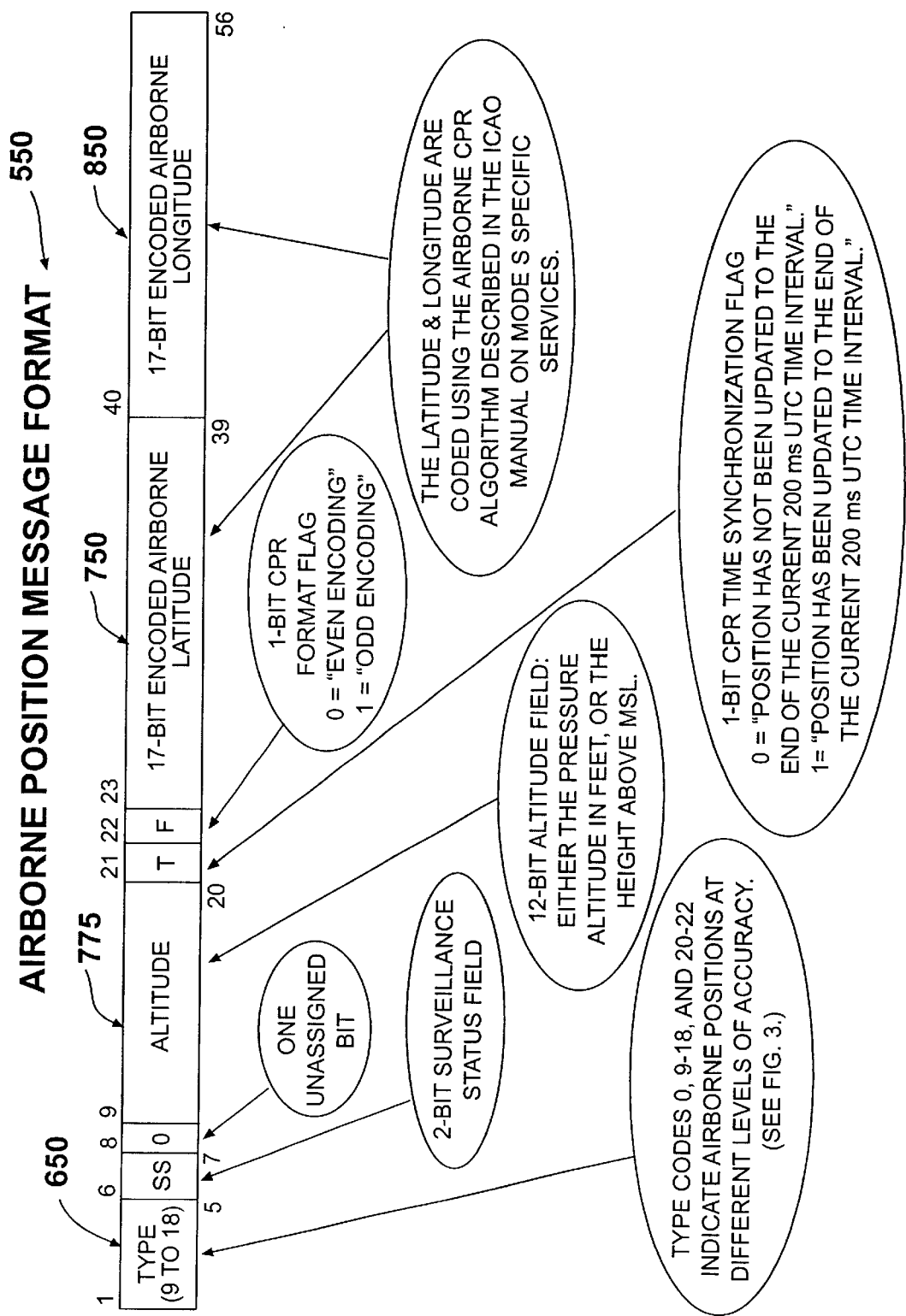
FIG. 2 is a schematic representation of an airborne position message transmitted by a transponder component of a navigational system according to one embodiment of the present invention.

In an airborne position message 550 as shown in FIG. 2, the type code field 600 indicates the message type as well as a type code 650 corresponding to a Navigation Uncertainty Category for Position ($NUC_P$). A correlation between the type code 650 and the $NUC_P$ value 700 is shown in FIG. 3. The $NUC_P$ code 700 indicates a level of confidence in the latitude 750 and longitude 800 coordinates included in the airborne position message 550. Generally, the $NUC_P$ 700 is determined from an integrity limit known as the "Horizontal Protection Limit" (HPL) 850, wherein an HPL 850 is typically a distance range corresponding to a discrete $NUC_P$ value 700, as further shown in FIG. 3. An HPL 850 is a measure of position integrity. More particularly, an HPL 850 represents the radius of a circle in the horizontal plane centered on the true position, which describes the region which is assured to contain the indicated horizontal position, meaning that the probability of the position fix being in error by more than the HPL 850, without a RAIM alarm being detected, is less than $10^{-7}$ per flight hour.

In instances where the navigational system 100 includes a "sole means of navigation" (DO-229A) GPS receiver 150, an HPL 850 may be readily available from the RAIM algorithm executed within the DO-229A GPS receiver 150. The HPL 850 received from the DO-229A GPS receiver 150 is then directed through the processing unit 250 to the transponder 300. The transponder 300, in turn, determines and sets a type code 650 corresponding to the HPL 850 received from the processing unit 250, wherein the type code 650 is included in the type code field 600 as part of the position message 550 transmitted to the receiving subsystem 400. The type code 650 received by the receiving subsystem 400 is then converted to the corresponding $NUC_P$ code 700 prior to utilization by the terminal application 500. Thus, the terminal application 500 is provided with the geodetic coordinates (latitude and longitude) of the navigational system 100 along with the accuracy and/or integrity of the transmitted coordinates. However, in some instances, an HPL 850 may not be available from the DO-229A GPS receiver 150 if RAIM is not available and/or if a RAIM alarm exists.

Where the transponder 300 is a Mode S transponder, the register for the position message 550 must be updated, for example, approximately every 200 milliseconds. Generally, the transponder 300 begins transmitting the position message 550 only after valid horizontal position integrity and/or accuracy information is received from the processing unit 250. While position integrity and/or accuracy information is available, the transponder 300 transmits the position message 550, for instance, twice per second at random intervals that are uniformly distributed over a range of 0.4 to 0.6 seconds relative to the previous position message transmission. If more than two seconds have elapsed without the transponder 300 receiving valid position integrity and/or accuracy information, the transponder 300 may clear the type code field 600 and the latitude 750 and longitude 800 position fields. However, the transponder 300 continues to update the altitude field 775 with current pressure altitude. Subsequently, the transponder 300 continues to transmit the position message 550 for the next 58 seconds or until valid position integrity and/or accuracy information becomes available. Typically, when 60 seconds have elapsed without valid position integrity and/or accuracy information, the transponder 300 stops transmitting the position message 550 until horizontal position integrity and/or accuracy information again becomes available. Thus, integrity and/or accuracy information in the form of a type code 650 or an $NUC_P$ value 700 may not be available in instances where an HPL 850 is not available due to either, for example, unavailability of a RAIM or the presence of a RAIM alarm.

In some instances, the navigational system 100 may not be equipped with a DO-229A GPS receiver 150, but instead may be equipped with only a "supplemental navigation" (DO-208) internal GPS receiver 200. Further, a DO-208 GPS receiver 200 may sometimes be configured to execute a RAIM algorithm as an internal consistency check. However, a DO-208 GPS receiver 200 typically does not output dynamically calculated HPL 850 values. Thus, where a navigational system 100 has only a DO-208 GPS receiver 200, a type code 650 will not be transmitted by the navigational system 100 since an HPL 850 is not available. Generally, the same occurs if an HPL 850 is not available in a navigational system 100 having both a DO-229A GPS receiver 150 and a DO-208 GPS receiver 200.

It has been discovered that, where a navigational system 100 includes only a DO-208 GPS receiver 200, that the HPL value 850 that is used in designating a corresponding $NUC_P$ 700 may be determined by introducing and using an appropriate Horizontal Alarm Limit (HAL) 825 in the RAIM algorithm of a DO-208 GPS receiver 200. As shown in FIG. 3, an HPL value 850 corresponding to a particular $NUC_P$ value 700 falls within a defined distance range. For example, an $NUC_P$ 700 of seven corresponds to an HPL value 850 that is greater than or equal to 25 meters, but less than 0.1 nautical miles. In this instance, an HPL value 850 equal to 0.1 nautical miles would be outside the allowable HPL values 850 corresponding to an $NUC_P$ 700 of seven. Thus, since any determined horizontal position accuracy of 0.1 nautical miles or greater would be outside the distance range of a $NUC_P$ 700 of seven, an appropriate and corresponding HAL 825 would be equal to 0.1 nautical miles. In other words, establishing an HAL 825 equal to 0.1 nautical miles for an $NUC_P$ 700 of seven considers all HPL values 850 less than 0.1 nautical miles.

In instances where the navigational system 100 is configured to implement a HAL 825, the selected HAL value 825 is directed from the processing unit 250 to the DO-208 GPS receiver 200 for use in the RAIM algorithm therein. The RAIM algorithm in the DO-208 GPS receiver 200 is then executed using the HAL value 825 from the processing unit 250. If RAIM is available, the RAIM algorithm determines the consistency of the position calculated by the DO-208 GPS receiver 200 and compares that consistency to the HAL value 825. If the consistency of the measurements returned by the RAIM algorithm are less than the HAL value 825, then no RAIM alarm is produced and the processing unit 250 is notified accordingly. The processing unit 250 then sets an HPL value 850 of slightly less than the HAL value 825 used in the RAIM algorithm, at about the upper range limit of the corresponding HPL distance range. In some instances, the processing unit 250 may produce a Horizontal Figure of Merit (HFOM) value 900 in lieu of and corresponding to the HPL value 850. An HFOM is defined as a 95% containment value on the accuracy of the position fix. As shown in FIG. 3, HFOM 900 ranges are accuracy values, wherein the range bounds are roughly half the range bounds of the corresponding HPL 850 ranges. Either the HPL 850 or the HFOM 900 may be used by the transponder 300 to determine the appropriate type code 650 to be transmitted by the navigational system 100.

In determining the appropriate HPL value 850 and/or the appropriate HFOM value 900 used by the transponder 300, embodiments of the present invention may operate, for example, in accordance with the correlation chart shown in FIG. 3. In such instances, the processing unit 250 is implemented to determine an HPL value 850 by using an appropriate HAL value 825 in the DO-208 GPS receiver's 200 internal RAIM algorithm. The resulting HPL value 850 is then sent by the processing unit 250, either as the HPL value 850 or as the corresponding HFOM value 900, to the transponder 300, from which the transponder 300 determines the corresponding type code value 650. Initially, the processing unit 250 sets the HAL 825 to slightly above the upper HPL 850 limit for the highest $NUC_P$ 700 value. Thus, for a highest $NUC_P$ 700 of seven, the processing unit 300 sets a HAL value 825 equal to 0.1 nautical miles, which is slightly above the upper range limit of the corresponding HPL 850. If the DO208 GPS receiver 200 determines that RAIM is available and does not return a RAIM alarm for the provided HAL of 0.1 nautical miles, the processing unit 300 then selects a value of slightly less than 0.1 nautical miles for the HPL value 850, corresponding to slightly less than 0.05 nautical miles for the HFOM value 900, either of which are then sent to the transponder 300. The transponder 300 then selects a corresponding type code 650 equal to eleven (further corresponding to a $NUC_P$ 700 value of seven) for transmission as a portion of the position message 550.

However, if the DO208 GPS receiver 200 detects a RAIM alarm or indicates that RAIM is not available, the processing unit 250 then supplies a HAL value 825 corresponding to the next successively greater HPL range 850 which, as shown in FIG. 3, would be slightly greater than the highest HPL value 850 corresponding to the next lower $NUC_P$ value 700 of six. The next HAL value 825 supplied to the RAIM algorithm would therefore be 0.2 nautical miles. If the test is passed, namely that RAIM is available and no RAIM alarm exists, the processing unit 250 then sets the HPL value 850 to slightly less than 0.2 nautical miles, corresponding to, for instance, to an HFOM value 900 to slightly less than 0.1 nautical miles. With these values, the transponder 300 then transmits a type code 650 of twelve in the position message 550 which corresponds to an $NUC_P$ value 700 of six. Should this subsequent test fail, however, the processing unit 250 proceeds sequentially to the next successively greater HAL values 825 which, according to the chart shown in FIG. 3, would be successive values of 0.5 nautical miles and 1 nautical mile in the defined sequence of HPL ranges 850.

If the processing unit 250 exhausts the possible HAL values 825 corresponding to the HPL ranges 850 used in the RAIM algorithm of and supported by the DO208 GPS receiver 200, the processing unit 250 then reverts to a default accuracy/integrity value corresponding to an $NUC_P$ value 700 of zero. Accordingly, as shown in FIG. 3, the processing unit 250 sets the HPL value 850 to slightly more than 20 nautical miles, corresponding to an HFOM value 900 of slightly more than 10 nautical miles. A corresponding type code 650 of 18 is then included in the position message 550 by the transponder 300, corresponding to the $NUC_P$ value 700 of zero, which means that the transmitted position has no or uncertain integrity. In other words, the transmitted geodetic coordinates of the navigational system 100 are reliable only to the extent of being within a relatively large distance range measured in nautical miles. These dynamic tests using HAL values 825 are repeated periodically so as to ensure that the processing unit 250 is continually updating the transponder 300 with an HFOM value 900 and/or an HPL value 850 such that the transponder 300 transmits the most current type code 650 for updating the position of the vehicle having the transmitting navigational system 100.

Note that it will be appreciated by one skilled in the art that a navigational system 100 as described herein may be realized in many different manners consistent with the spirit and scope of the present invention. Therefore, it will be further appreciated that the described navigational system 100 as described herein supports a corresponding apparatus and methodology. In addition, the described navigational system 100 may be implemented in software, hardware, or a combination of software and hardware, as will be appreciated by one skilled in the art so as to support a corresponding system based upon a computer device and associated computer software.

Thus, embodiments of the present invention provide a method, apparatus, system, and computer software program product for determining position integrity in a system having a GNSS component, such as a GPS device. Such a navigational system 100 having a GNSS component is capable of determining the integrity of measured geodetic coordinates in instances where RAIM is not available or RAIM alarm has been generated. Such a navigational system 100 may be configured with, for example, a "supplemental navigation" DO208 GPS receiver 200 and/or a "sole means of navigation" DO-229A GPS receiver 150 and provides a method of determining the integrity of the measured geodetic coordinates even if other methods are used by the system. Embodiments of the present invention are particularly advantageous for determining position integrity information when the vehicle is equipped with a "supplemental navigation" DO-228 GPS receiver 200 lacking the capability of determining an HPL value 850. Thus, embodiments of the present invention provide distinct advantages over prior art navigational systems having a GNSS component.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for determining position integrity in a system having a Global Navigation Satellite System (GNSS) component, comprising:
   selectively determining whether valid position integrity information is available for an alarm limit in a plurality of successive alarm limits, with each alarm limit corresponding to a position integrity level;
   determining the position integrity level corresponding to the alarm limit at which valid position integrity information is first available; and
   designating a default position integrity level if valid position integrity information is unavailable for any of the alarm limits.

2. A method according to claim 1 wherein the alarm limits are arranged in an increasing sequence from a lower alarm limit to an upper alarm limit and determining whether valid position integrity information is available further comprises first determining whether valid position integrity information is available for the lower alarm limit.

3. A method according to claim 1 further comprising designating a type code corresponding to at least one of the position integrity level corresponding to the alarm limit at which valid position integrity information is first available and the default position integrity level.

4. A method according to claim 1 wherein determining whether valid position integrity information is available further comprises determining whether valid position integrity information is available by executing a Receiver Autonomous Integrity Monitoring (RAIM) algorithm for the successive alarm limits.

5. A method according to claim 4 wherein executing a RAIM algorithm for the successive alarm limits further comprises executing a RAIM algorithm for successive Horizontal Alarm Limits (HALs).

6. A method according to claim 5 wherein determining the position integrity level corresponding to the alarm limit at which valid position integrity information is first available further comprises determining the Horizontal Protection Level (HPL) corresponding to the first HAL at which the executed RAIM algorithm indicates at least one of the availability of RAIM and the absence of a RAIM alarm.

7. A method according to claim 6 wherein designating a default position integrity level further comprises designating a default HPL if the executed RAIM algorithm is unable to indicate at least one of the availability of RAIM and the absence of a RAIM alarm for any of the HALs.

8. A method according to claim 7 further comprising determining a Horizontal Figure of Merit (HFOM) corresponding to at least one of the HPL corresponding to the first HAL at which the executed RAIM algorithm indicates at least one of the availability of RAIM and the absence of a RAIM alarm and the default HPL.

9. An apparatus for determining position integrity information, and transmitting at least one of position accuracy information and position integrity information, in a system having a Global Navigation Satellite System (GNSS) component, comprising:
 a transponder configured to transmit a type code indicative of at least one of position accuracy information and position integrity information;
 a navigational device capable of executing a Receiver Autonomous Integrity Monitoring (RAIM) algorithm to determine whether valid position integrity information is available; and
 a processing unit in communication with the transponder and the navigational device, the processing unit being configured to selectively provide successive alarm limits to the RAIM algorithm executed by the navigational device, the processing unit being further configured to determine a valid position integrity level corresponding to the alarm limit at which valid position integrity information is first available and to designate a default position integrity level if valid position integrity information is unavailable for any of the alarm limits, the processing unit thereafter being configured to direct to the transponder at least one of the valid position integrity level, the default position integrity level, and a position accuracy level corresponding to at least one of the valid position integrity level and the default position integrity level, from which the transponder thereafter determines the corresponding type code for transmission.

10. An apparatus according to claim 9 wherein the alarm limits are arranged in an increasing sequence from a lower alarm limit to an upper alarm limit and the processing unit is further configured to first provide the lower alarm limit to the RAIM algorithm executed by the navigational device.

11. An apparatus according to claim 9 further comprising an antenna in communication with the transponder for facilitating the transmission of the type code.

12. An apparatus according to claim 9 wherein the navigational device comprises a Global Positioning System (GPS) device.

13. An apparatus according to claim 12 wherein the navigational device comprises at least one of a supplemental navigation (DO-208) GPS receiver and a sole means of navigation (DO-229A) GPS receiver.

14. An apparatus according to claim 9 wherein the transponder comprises a Mode-S transponder.

15. An apparatus according to claim 9 wherein the processing unit is configured to selectively provide successive Horizontal Alarm Limits (HALs) to the RAIM algorithm executed by the navigational device.

16. An apparatus according to claim 15 wherein the processing unit is further configured to determine a Horizontal Protection Level (HPL) corresponding to the HAL at which the executed RAIM algorithm indicates at least one of the availability of RAIM and the absence of a RAIM alarm.

17. An apparatus according to claim 16 wherein the processing unit is further configured to designate a default HPL if the executed RAIM algorithm is unable to indicate at least one of the availability of RAIM and the absence of a RAIM alarm for any of the HALs.

18. An apparatus according to claim 17 wherein the processing unit is further configured to direct to the transponder at least one of the HPL, the default HPL, and a Horizontal Figure of Merit (HFOM) corresponding to at least one of the HPL and the default HPL, from which the transponder thereafter determines the corresponding type code, indicative of a Navigation Uncertainty Category for Position ($NUC_P$) value, for transmission.

19. A system capable of determining position integrity information, and transmitting at least one of position accuracy information and position integrity information, in an apparatus having a Global Navigation Satellite System (GNSS) component, comprising:
 a computer device comprising:
  a first processing portion for directing the execution of a Receiver Autonomous Integrity Monitoring (RAIM) algorithm to determine whether valid position integrity information is available;
  a second processing portion for selectively providing successive alarm limits to the RAIM algorithm so as to determine a valid position integrity level corresponding to the alarm limit at which valid position integrity information is first available;
  a third processing portion for designating a default position integrity level if no valid position integrity information is available for any of the alarm limits; and
  a fourth processing portion for directing to a transponder at least one of the valid position integrity level, the default position integrity level, and a position accuracy level corresponding to at least one of the valid position integrity level and the default position integrity level, from which the transponder thereafter determines the corresponding type code for transmission.

20. A system according to claim 19 wherein the alarm limits are arranged in an increasing sequence from a lower alarm limit to an upper alarm limit and the second processing portion is further configured to first provide the lower alarm limit to the RAIM algorithm.

21. A system according to claim 19 wherein the transponder further comprises a Mode S transponder.

22. A system according to claim 19 further comprising an antenna in communication with the transponder for facilitating the transmission of the type code.

23. A system according to claim 19 further comprising a navigational device configured to execute a RAIM algorithm and being in communication with the computer device.

24. A system according to claim 23 wherein the navigational device comprises a Global Positioning System (GPS) device.

25. A system according to claim 24 where in the navigational device comprises at least one of a supplemental navigation (DO-208) GPS receiver and a sole means of navigation (DO-229A) GPS receiver.

26. A system according to claim 23 wherein the second processing portion of the computer device is configured to selectively provide successive Horizontal Alarm Limits (HALs) to the navigational device for execution of the RAIM algorithm.

27. A system according to claim 26 wherein the second processing portion is further configured to determine a Horizontal Protection Level (HPL) corresponding to the first HAL at which the executed RAIM algorithm indicates at least one of the availability of RAIM and the absence of a RAIM alarm.

28. A system according to claim 27 wherein the third processing portion is further configured to designate a default HPL if the executed RAIM algorithm is unable to indicate at least one of the availability of RAIM and the absence of a RAIM alarm for any of the HALs.

29. A system according to claim 28 wherein the fourth processing portion is further configured to direct to the transponder at least one of the HPL, the default HPL, and a Horizontal Figure of Merit (HFOM) corresponding to at least one of the HPL and the default HPL, from which the transponder thereafter determines the corresponding type code, indicative of a Navigation Uncertainty Category for Position ($NUC_P$) value, for transmission.

30. A computer software program product for determining position integrity information, and transmitting at least one of position accuracy information and position integrity information, in a system having a Global Navigation Satellite System (GNSS) component, comprising:
 a first executable portion configured to direct the execution of a Receiver Autonomous Integrity Monitoring (RAIM) algorithm to determine whether valid position integrity information is available;
 a second executable portion configured to selectively provide successive alarm limits to the RAIM algorithm so as to determine a valid position integrity level corresponding to the alarm limit in the sequence at which valid position integrity information is first available;
 a third executable portion configured to designate a default position integrity level if no valid position integrity information is available for any of the alarm limits; and
 a fourth executable portion configured to direct to a transponder at least one of the valid position integrity level, the default position integrity level, and a position accuracy level corresponding to at least one of the valid position integrity level and the default position integrity level, from which the transponder thereafter determines the corresponding type code for transmission.

31. A computer software program product according to claim 30 wherein the alarm limits are arranged in an increasing sequence from a lower alarm limit to an upper alarm limit and the second executable portion is further configured to first provide the lower alarm limit to the RAIM algorithm.

32. A computer software program product according to claim 30 wherein the transponder further comprises a Mode S transponder having an antenna in communication therewith and the computer software program product further comprises a fifth executable portion for directing the transponder to transmit the type code.

33. A computer software program product according to claim 30 wherein the first executable portion is communicable with a navigational device configured to execute a RAIM algorithm.

34. A computer software program product according to claim 33 wherein the navigational device comprises a Global Positioning System (GPS) device.

35. A computer software program product according to claim 34 wherein the navigational device comprises at least one of a supplemental navigation (DO208) GPS receiver and a sole means of navigation (DO-229A) GPS receiver.

36. A computer software program product according to claim 33 wherein the second executable portion is further configured to selectively provide successive Horizontal Alarm Limits (HALs) to the navigational device for execution of the RAIM algorithm.

37. A computer software program according to claim 36 wherein the second executable portion is further configured to determine a Horizontal Protection Level (HPL) corresponding to the first HAL at which the executed RAIM algorithm indicates at least one of the availability of RAIM and the absence of a RAIM alarm.

38. A computer software program according to claim 37 wherein the third executable portion is further configured to designate a default HPL if the executed RAIM algorithm is unable to indicate at least one of the availability of RAIM and the absence of a RAIM alarm for any of the HALs.

39. A computer software program according to claim 38 wherein the fourth executable portion is further configured to direct to the transponder at least one of the HPL, the default HPL, and a Horizontal Figure of Merit (HFOM) corresponding to at least one of the HPL and the default HPL, from which the transponder thereafter determines the corresponding type code, indicative of a Navigation Uncertainty Category for Position ($NUC_P$) value, for transmission.

* * * * *